(12) United States Patent
Groubert et al.

(10) Patent No.: US 8,720,748 B2
(45) Date of Patent: May 13, 2014

(54) FULL OPEN DISK DISPENSING CLOSURE

(75) Inventors: Brian David Groubert, Boardman, OH (US); Barry Daggett, Austintown, OH (US)

(73) Assignee: WeatherChem Corporation, Twinsburg, OH (US)

( * ) Notice: Subject to any disclaimer, the term of this patent is extended or adjusted under 35 U.S.C. 154(b) by 300 days.

(21) Appl. No.: 12/899,278

(22) Filed: Oct. 6, 2010

(65) Prior Publication Data

US 2012/0085791 A1    Apr. 12, 2012

(51) Int. Cl.
*B67D 3/00* (2006.01)

(52) U.S. Cl.
USPC .......... 222/480; 222/565; 222/548; 222/555; 222/556

(58) Field of Classification Search
CPC ........................................................ B67D 3/00
USPC ......... 222/565, 478, 480, 511, 547, 548, 555, 222/559, 564, 153.14, 153.01, 562, 544, 222/502, 503, 566, 567, 568, 481, 482, 537, 222/556; 55/490; 209/233; 239/374, 376, 239/266; 220/550
See application file for complete search history.

(56) References Cited

U.S. PATENT DOCUMENTS

| | | | | |
|---|---|---|---|---|
| 4,127,221 A * | 11/1978 | Vere | .......................... | 222/153.02 |
| 4,724,977 A * | 2/1988 | Cleevely et al. | ........... | 220/258.2 |
| 4,823,995 A * | 4/1989 | Lewis | ............................ | 222/545 |
| 5,507,419 A * | 4/1996 | Martin et al. | ................. | 222/480 |
| 5,975,368 A * | 11/1999 | Wood | ............................ | 222/151 |
| 6,460,712 B2 * | 10/2002 | Smith et al. | ................... | 215/235 |
| 2011/0272953 A1 * | 11/2011 | Mercier et al. | ................ | 292/195 |

OTHER PUBLICATIONS

Office Action dated Apr. 4, 2013 for Canadian Patent Application No. 2754296, 3 pages.

* cited by examiner

*Primary Examiner* — Paul R Durand
*Assistant Examiner* — Jeremy W Carroll
(74) *Attorney, Agent, or Firm* — Amin, Turocy & Watson, LLP (57) ABSTRACT

A dispensing closure is provided that includes a body portion and a flap portion. The body portion can include an end wall, a skirt that depends from end wall, and an opening about the same size as the end wall. The flap portion can include a lid having at least one dispensing opening and a disk that has one or more dispensing orifices. The disk is in rotatable contact with the lid. A lock portion can include a surface area formed on the flap portion. The lock portion can also include a first substantially vertical piece formed on a first side of surface area, a second substantially vertical piece formed on a second side of surface area, and a substantially horizontal piece formed at a bottom of the first substantially vertical piece and the second substantially vertical piece.

17 Claims, 6 Drawing Sheets

FULL OPEN DISK DISPENSING CLOSURE

TECHNICAL FIELD

The following description relates generally to dispensing closures for bottles, jars, and the like, and, more particularly to dispensing closures with large openings for dispensing product.

BACKGROUND

Dispensing closures or caps are utilized with containers (e.g., bottles, jars, cans, and so forth) that can be used with a wide variety of products (e.g., food products, powders, fertilizers, grass seed, hardware (such as nuts and bolts), and so on). The size of the container and the container mouth (e.g., portion of the container to which the dispensing closure engages) is a function of the size of the contents to be stored in the container. If the contents are large or should be dispensed in large quantities, the container, the container mouth, and the dispensing closure can be large. On the other hand, if the contents are small and/or should be dispensed in small quantities, the container mouth and dispensing closure can be small.

Further, the dispensing closure can include components, such as a flap that can be flipped away from a main portion of the dispensing closure in order to access contents of the container. The flipping or pivot action can provide access to the container contents without the need to completely remove the dispensing closure from the container (e.g., allowing access to the container contents with minimal effort). However, in some cases, the dispensing opening(s) might not be large enough to provide the desired flow of contents out of the container. Therefore, to dispense a large amount of the contents from the container (or to dispense the contents faster), the dispensing closure might be removed from the container (e.g., pulled off, unscrewed and so forth) to obtain the desired flow of contents from the container. Removal of the entire dispensing closure can be cumbersome and can result in spillage of the container contents, especially if the dispensing closure is not screwed back on or is not otherwise attached to the container after the contents are dispensed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect relates to a dispensing closure comprising a body portion and a flap portion. The body portion comprises an end wall and a skirt that depends from the end wall. The skirt engages the dispensing closure with a container. The body portion also comprises an opening in the end wall. The opening is about the same size as the end wall and contents of the container are accessed through the opening. The flap portion comprises a lid that comprises at least one dispensing opening and a disk comprising one or more dispensing orifices. The disk is in rotatable contact with the lid.

Another aspect relates to a dispensing closure comprising a body portion, a flap portion, and a lock portion. The body portion comprises an end wall and a skirt that depends from the end wall. The skirt engages the dispensing closure with a container. The lock portion comprises a surface area formed on the flap portion. The lock portion also comprises a first substantially vertical piece formed on a first side of the surface area and a second substantially vertical piece formed on a second side of the surface area. Further, the lock portion comprises a substantially horizontal piece formed at a bottom of the first substantially vertical piece and the second substantially vertical piece. The surface area, the first substantially vertical piece, the second substantially vertical piece, and the substantially horizontal piece form a latched opening.

A further aspect relates to a dispensing closure comprising a body portion, a flap portion, and a lock member. The body portion comprises an end wall and a skirt that depends from the end wall, the skirt engages the dispensing closure with a container. The flap portion comprises a lid that comprises at least one dispensing opening and a disk in rotatable contact with the lid, the disk comprises one or more dispensing orifices. The lock member engages the body portion and the flap portion in a sift-resistant manner.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
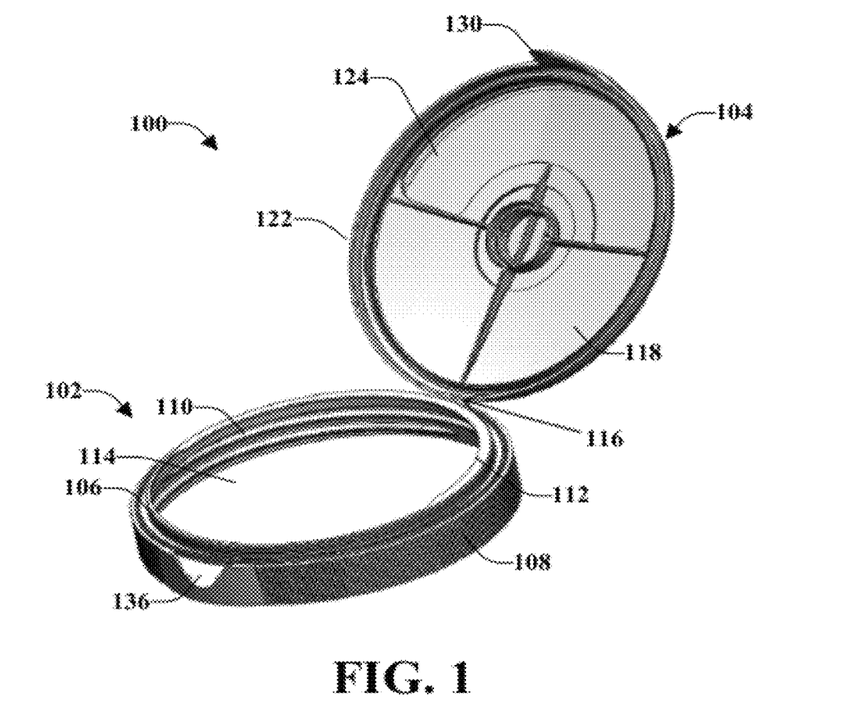
FIG. 1 illustrates a dispensing closure in a full open position, according to an aspect.

Now turning to the figures, FIG. 1 illustrates a perspective view of a full open disk dispensing closure 100, according to an aspect. The full open disk dispensing closure 100 can dispense contents of a container (to which the dispensing closure is attached) in a matter that is suitable for an intended purpose (e.g., at a rate that is desired by a user). The dispensing closure 100 can provide both full open and dispensing capabilities. For example, if a person is dispensing grass seed from the container and only a small portion of ground is to be covered, the grass seed can be placed in the container and dispensed though one or more dispensing orifices (and a dispensing opening(s)) in a pourable manner. In another example, if the person wants to dispense rock salt over a sidewalk, the person might want to dispense the rock salt as quickly as possible due to the cold weather. Therefore, the dispensing closure can be utilized in a full open manner to dispense the rock salt quicker than it would be dispensed utilizing the one or more dispensing orifices (e.g., in a pourable manner). The full open manner of dispensing can be achieved without removing the dispensing closure 100 from a container.

The dispensing closure 100 can be a unitary or a one-piece structure. However, in accordance with some aspects, the dispensing closure can be formed as a multiple piece structure. It should be noted that although the various aspects are illustrated as a generally circular dispensing closure, the various aspects are not limited to this implementation. In accordance with some aspects, the dispensing closure can have a different geometric shape (e.g., oval, oblong, and so on).

Ordinarily, a dispensing closure is installed upright on the top of a container that has a mouth that typically lies in a horizontal plane. For purposes of discussion, the vertical direction generally corresponds to an axial direction with reference to the geometry of the dispensing closure 100 and the horizontal direction or horizontal plane is perpendicular to the axial direction of the dispending closure 100 (e.g., the vertical direction). It should be understood that during molding, the dispensing closure could have a non-upright orientation.

Dispensing closure 100 comprises a body portion 102 and a flap portion 104. The body portion 102 comprises an end wall 106. According to some aspects, the end wall 106 can be generally circular, however, other configurations are possible with the disclosed aspects. A hollow or tubular skirt 108 depends from the end wall 106. The skirt 108 can be generally cylindrical or a different shape, which can be a function of the shape of the end wall 106. The skirt 108 is configured to engage with a container (e.g., bottle, jar, and so forth). For example, the skirt 108 can engage with a mouth of the container in a threaded manner or in a non-threaded manner. Further, the dispensing closure 100 can engage the container in a removable manner or in a non-removable manner. A container assembly comprises the dispensing closure 100 and the container.

In accordance with some aspects, an interior portion of the skirt 108 can comprise screw threads 110 that are configured to engage complimentary threads on a neck portion of the container, wherein the dispensing closure 100 can be screwed onto the mouth of the container. According to some aspects, internal threads are not utilized and the dispensing closure 100 is engaged with the container through other means (e.g., snap-on, press-on, and so forth). An exterior portion of the skirt 108 can be smooth or can comprise small vertical grooves or other textural features that can improve a person's ability to grip the dispensing closure 100 for removal from the container (e.g., by unscrewing, by pulling the dispensing closure 100 away from the container, and so on).

The end wall 106 can be formed with a lip 112, wherein the lip 112 defines the size of an opening 114 of the body portion 102. The opening 114 can be sized to provide full open dispensing capabilities (e.g., about the same amount of dispensing capability as would be provided were the dispensing closure 100 removed from the container). Providing full open dispensing capabilities, without requiring removal of the dispensing closure, provides ease of use and dispensing. The full-open dispensing capability provides the advantage of not requiring a user to remove the dispensing closure from the container to achieve similar results.

At least a portion of the lip 112 can protrude slightly into the opening 114 (away from end wall 106) in order to provide support for the flap portion 104 when the flap portion 104 is engaged over the body portion 102. In accordance with some aspects, only about one half (or other percentage) of the perimeter of the end wall 106 might have a lip 112 that protrudes slightly into the opening 114. However, in accordance with some aspects, almost the entire end wall might have a lip.

Figure 2A:
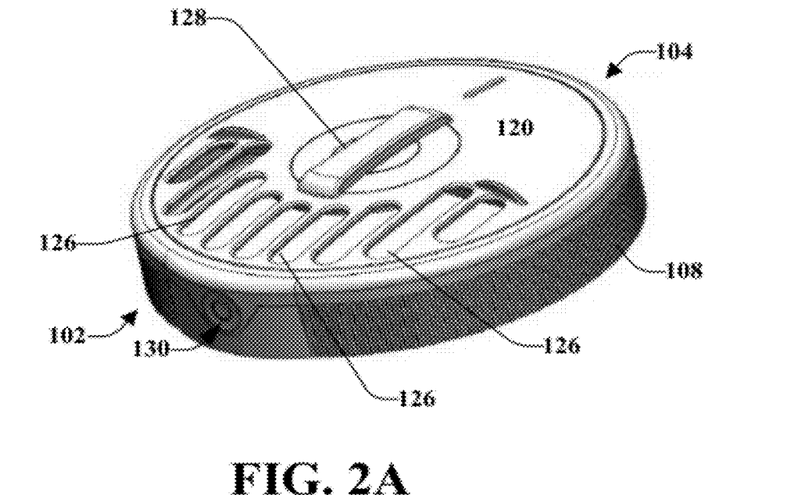
FIG. 2A illustrates a perspective view of a dispensing closure comprising a full open rotating disk in an open position, according to an aspect
Figure 2B:
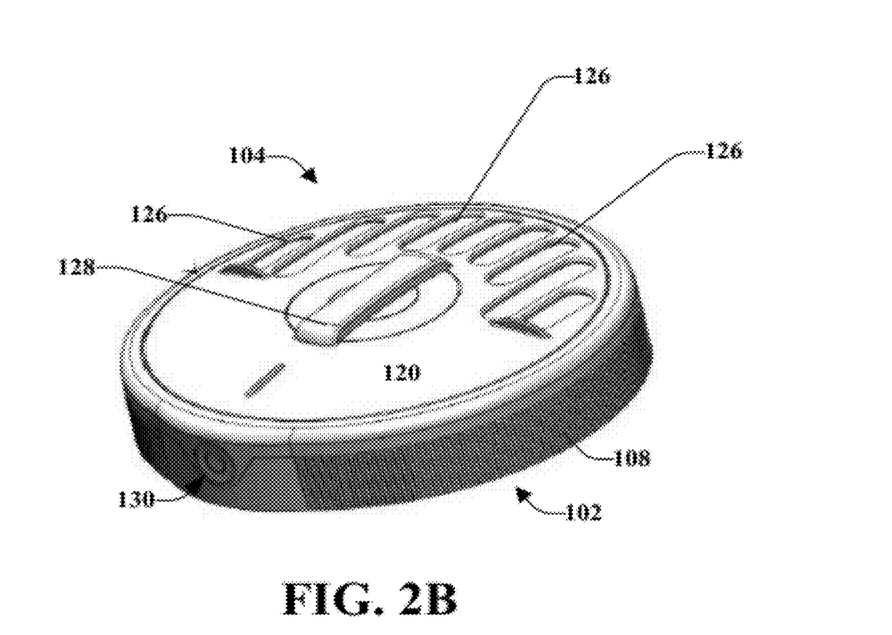
FIG. 2B illustrates a perspective view of the dispensing closure comprising a full open rotating disk in a closed position, according to an aspect.

The flap portion 104 is pivotally joined to the end wall 106 by, for example, a hinge 116. The hinge can be a "living hinge", a "pivoting hinge", or another type of hinge. A living hinge is a hinge formed with the body portion and the flap portion as a single piece. A pivoting hinge is formed with the body portion (or the flap portion), wherein the body portion and flap portion are formed as separate pieces and snapped together at the hinge to combine the two pieces. The hinge 116 lies in a plane perpendicular to the axis of a skirt 108. The hinge 116 allows for ease of moving the flap portion 104, wherein the flap portion 104 comprises at least two positions, namely, a first position and a second position. When in the first position, the flap portion 104 is "open" (or moved away from the body portion 102), which allows product to be dispensed in a full-open manner (as shown in FIG. 1). FIGS. 2A and 2B illustrate perspective views of the dispensing closure 100 when the flap portion 104 is in second position, or engaged with the body portion 102.

The hinge 116 can be constructed of a relatively thin wall that is configured to flex without breakage during an expected service life of the dispensing closure 100. The hinge 116 allows the flap portion 104 to be moved away from the body portion 102 (e.g., flipped up, placed into second position) for dispensing in a "full open" manner. The hinge 116 allows the flap portion 104 to be moved into contact with the body portion 102 (e.g., placed into first position) for dispensing in a non-full open manner (e.g., in a pourable manner) or for storage purposes. In accordance with some aspects, the body portion 102 and the flap portion 104 can be separate pieces (e.g., a hinge is not utilized).

Figure 3:
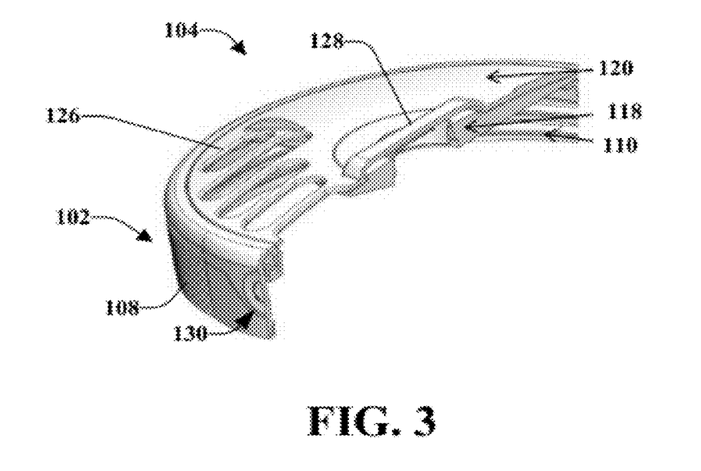
FIG. 3 illustrates a cut-away perspective view of the dispensing closure, according to an aspect.

Flap portion 104 comprises a lid 118 and a disk 120, as illustrated in FIG. 3, which is a cutaway view of the dispensing closure 100. The lid comprises an outer edge 122 that is configured to engage on outer edge of end wall 106 when the flap portion 104 is in a closed position. For example, the outer edge 122 is configured to engage on the outer edge of end wall 106 to provide sealing capabilities (e.g., the engagement helps to secure the contents within the container).

The lid 118 comprises at least one dispensing opening 124 that can cover around one-half or less of the surface area of the lid 118. The disk 120 comprises one or more dispensing orifices 126 (only a few of which are labeled). One or more of the dispensing orifices 126 align with the at least a portion of the dispensing opening 124 to dispense contents of the container in a pourable manner. In accordance with some aspects, the disk 120 comprises the dispensing openings and the lid 118 comprises the dispensing orifices.

Figure 4A:
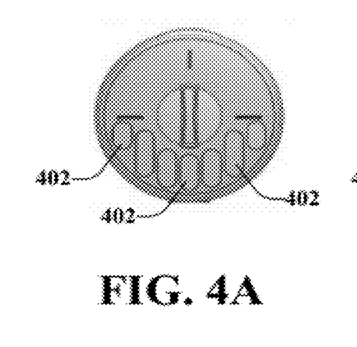
FIGS. 4A, 4B, and 4C illustrate example openings in a rotating disk portion of a dispensing closure according to various aspects.
Figure 4B:
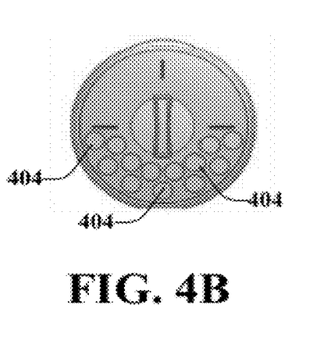
Figure 4C:
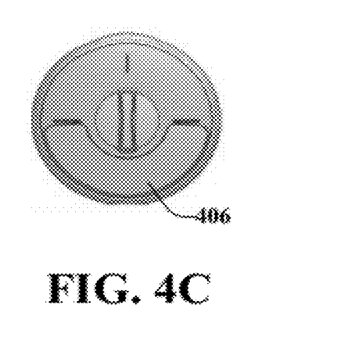
Figure 5A:
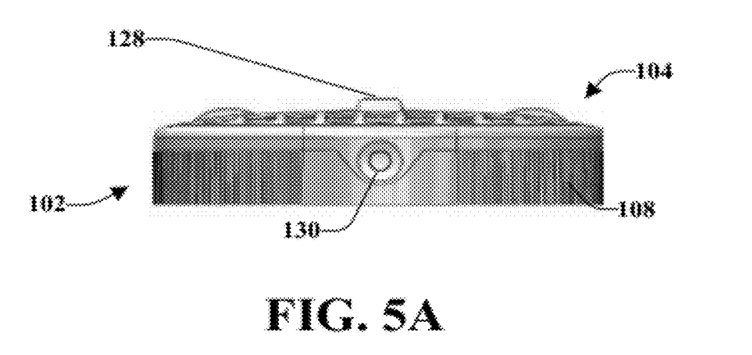
FIG. 5A illustrates a front perspective view of a dispensing closure, according to an aspect.
Figure 5B:
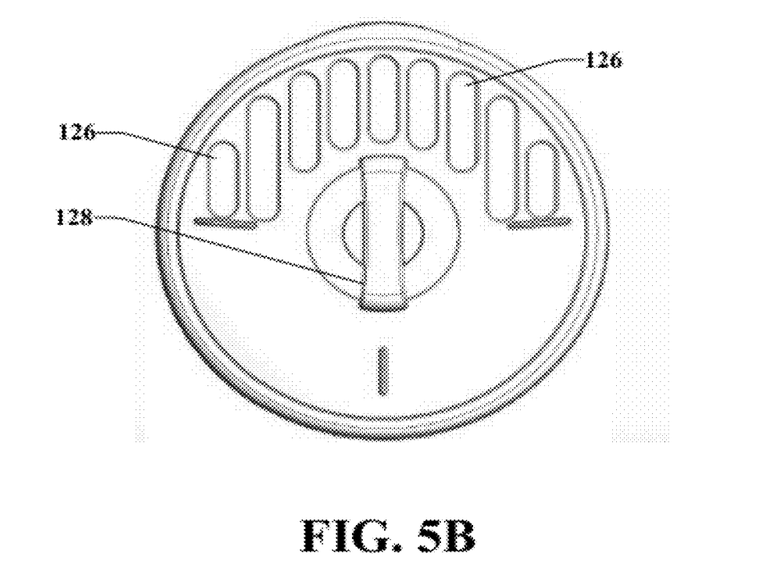
FIG. 5B illustrates a top view of the dispensing closure of FIG. 5A, according to an aspect.

There can be different types of dispensing orifices in the disk 120 (or in the lid 118, according to an aspect). As shown in FIG. 4A, the dispensing orifices can be slotted 402 (similar to the dispensing orifices 126 of FIGS. 2A, 2B, 3, and 5B). In another example, as shown in FIG. 4B, the dispensing orifices can be substantially circular holes 404. In a further example, as shown in FIG. 4C, a single dispensing orifice 406 is provided, which can be about the same size as an a dispensing opening in the lid and which can allow for "full pour" of the container contents. Other dispensing orifices in the disk (or the lid) can be utilized in accordance with the disclosed aspects. For example, the orifices can be a combination of slotted and circular holes. In another example, the orifices can be different geometric shapes than the shapes shown and described. Further, the size of the dispensing orifices can vary. In accordance with some aspects, the amount and spacing of the orifices can be different from the designs illustrated. The position, type, and number of orifices can be determined as a function of the product that is to be dispensed through the orifices and/or the desired flow rate of the contents from the container.

The disk 120 is operatively engaged with the lid 118 in a rotatable manner. Thus, the disk 120 can be rotated between an "open" position (shown in FIG. 2A), a "closed" position (shown in FIG. 2B), or any position there between. When in the "open" position (FIG. 2A), at least one dispensing orifice 126 of the disk 120 is over at least one dispensing opening 124 of the lid 118. In this position, contents of the container can be poured though the at least one dispensing opening 124 and the at least one dispensing orifice 126 (e.g., there is no obstruction to the movement of the contents out of the container though the one or more dispensing openings and/or dispensing orifices). When the disk is "closed" (FIG. 2B) there are no dispensing orifices 126 over the dispensing opening 124 and product cannot be dispensed. Thus, flow of the contents out of the container are obstructed due to the material of the lid 118, disk 120, or material of both the lid 118 and the disk 120.

In accordance with some aspects, the dispensing orifice(s) is located in the lid and the dispensing opening(s) is located in the disk. For example, the lid can have dispensing orifices, such as slotted orifices, circular hole orifices, full pour slot orifices, and so forth, and the disk can have a single slot opening (or other dispensing openings that are substantially the same as the orifice(s) in the lid). Thus, the placement of the dispensing openings and/or dispensing orifices can be in either (or both) the lid and the disk as long as contents can be poured from the container.

To facilitate the rotatable movement of the disk 120, a grip portion 128 can be formed with the disk 120. The grip portion 128 can help improve a person's ability to rotate the disk 120 for dispensing of the container contents in the desired manner. In accordance with some aspects, the grip portion 128 can be formed with the lid 118 (if the lid and disk 120 are separate pieces) and the disk 120 can be formed with an opening that allows the disk 120 to be operative connected to the lid (e.g., grip portion 128 can be selectively engages through the opening formed in the disk). In accordance with some aspects, the grip portion 128 can be formed with the disk 120 (if the lid and disk 120 are separate pieces). According to some aspects, the lid 118 and disk 120 are formed as a single piece.

Although the grip portion 128 is illustrated as a straight piece of material that extends perpendicular to the hinge 116, other configurations can be utilized. For example, the grip portion can be parallel to hinge 116 or at an angle relative to hinge 116. In another example, the grip portion can form a cross ("+") configuration or another configuration that can facilitate rotation of the disk 120.

In accordance with some aspects, dispensing closure 100 comprises a secure positive lock (or a push button lock) to help prevent inadvertent full open of the dispensing closure 100, which could result in spillage of the container contents. Flap portion 104 can comprise a lock portion 130. Lock portion 130 comprises a surface area 132 that can be utilized to "lock" and "unlock" the positive lock. The surface area 132 can be formed with a latched opening 134 that comprises two substantially vertical pieces extending down from the sides of the surface area. For example, one substantially vertical piece is formed on a first side of the surface area 132 and the second substantially vertical piece is formed on a second side of the surface area 132. The lock portion 130 also comprises a substantially horizontal piece formed at the bottom (e.g., end opposite the surface area 132) of the two substantially vertical pieces, wherein the horizontal piece provides a connection between the two substantially vertical pieces. The surface area 132, two substantially vertical pieces, and the substantially horizontal piece form the latched opening 134.

Figure 6:
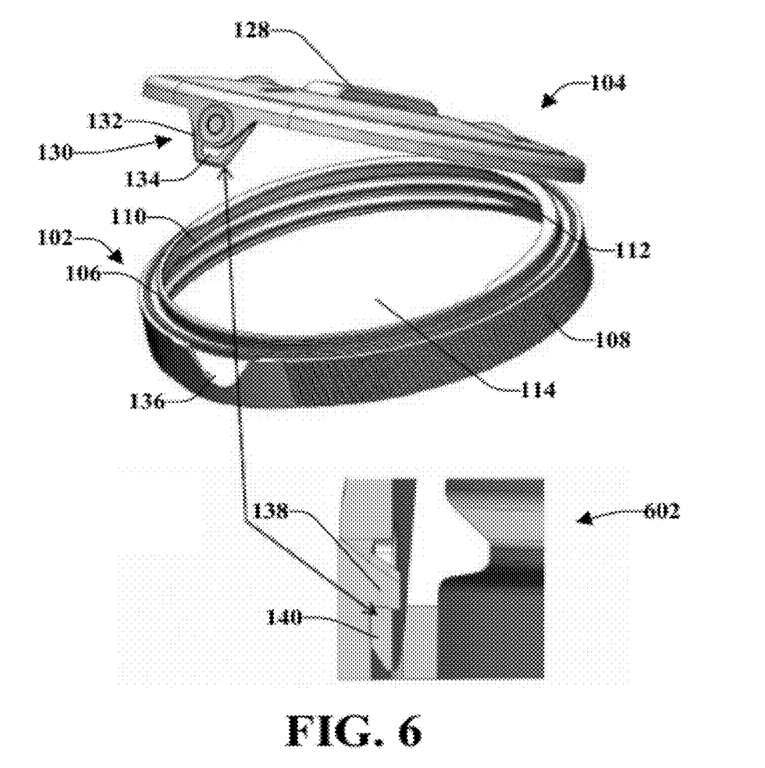
FIG. 6 illustrates a dispensing closure in a partially-open position, according to an aspect.

The latched opening 134 is configured to engage in a lock engagement opening 136 of body portion 102, as shown in FIGS. 1 and 6. The lock engagement opening 136 can be formed in the skirt 108 and provides an access area wherein at least the two substantially vertical pieces and the substantially horizontal piece of the lock portion 130 can be inserted (at least partially) into the lock engagement opening 136. After insertion, the horizontal and vertical pieces can be operatively connected to (or engage with) a protrusion 138 formed on an internal portion of skirt 108 (as shown in the exploded view 602 of FIG. 6). The protrusion 138 is formed slightly below the lock engagement opening 136. The substantially horizontal piece 140 of the latched opening 134 is engaged under the protrusion 138 in a secure manner. When in this position, the surface area 132 covers the lock engagement opening 136 in a sealed manner.

Flexibility of the lock portion 130 allows the latched opening 134 to move slightly inward (toward the opening 114) as a user closes the flap portion 104 and inserts the latched opening 134 into the lock engagement opening 136. The latched opening 134 moves along an internal portion of the skirt 108 and slightly behind the protrusion 138 (into the opening 114). When the substantially horizontal piece 140 clears the protrusion 138, the latched opening 134 moves slightly toward the skirt 108 (away from the opening 114) and the latched opening 134 (e.g., substantially horizontal piece 140, substantially vertical pieces) engages the protrusion 138 in a locked manner. The latching mechanism helps to ensure that the flap portion 104 cannot just be pulled away from the body portion 102, as might occur were the container (and dispensing closure) dropped and the secure lock not provided (or not utilized).

When the user desires to open the flap portion 104, the user presses on surface area 132. The pressure on surface area 132 pushes the lock portion 130 (e.g., the substantially horizontal and vertical pieces) away from the protrusion 138 and slightly into the opening 114. Once the latched opening 134 is cleared from (e.g., moved away from) protrusion 138, slight upward pressure causes the flap portion 104 to move away from body portion 102 (e.g., the movement is facilitated by hinge 116). Thus, the user must push in and up on the secure lock in order to unlock the flap portion 104 from the body portion 102.

Figure 7:
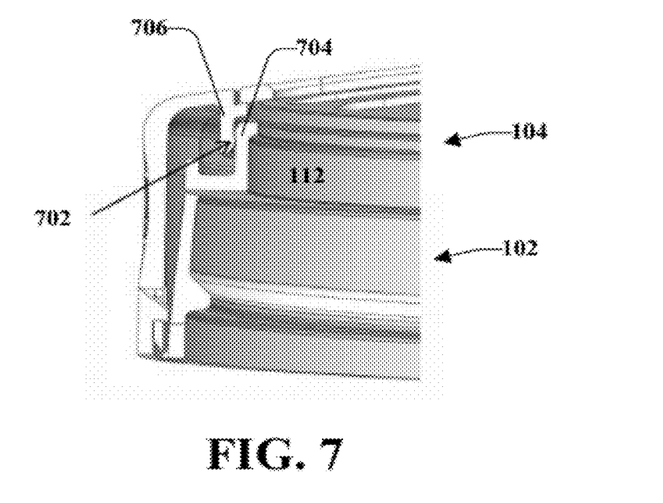
FIG. 7 illustrates a portion of a sift-resistant dispensing closure in accordance with various aspects presented herein.

FIG. 7 illustrates a portion of a dispensing closure having a sift-resistant feature, according to an aspect. When a fine product (such as a powder or a spice) is placed in a container, the dispensing closure of the disclosed aspects can provide a tight seal between the body portion 102 and the flap portion 104. This tight seal can help prevent the product from leaking though crevices that might be formed between the body portion 102 and the flap portion 104. As shown, a lock member 702 can be provided for the sift-resistance. The lock member 702 can be formed at an outer edge 122 of the flap portion 104 adjacent the lip 112. The lock member 702 can be a snap-bead that releasably holds the flap portion 104 closed against the end wall and lip 112 of the body portion 102.

The lock member 702 comprises a first member 704 formed on an outer edge of the lip 112 of the body portion 102 and a second member 706, complimentary to the first portion, formed on the flap portion 104. The second member 706 comprises protrusions formed on the inside surface of the flap portion 104 and has a shape and a length that matches the corresponding structures of the body portion 102 (e.g., first portion 704).

As shown in FIG. 7, the second member 706 engages and holds the first member 704 when the flap portion 104 is in a closed position (e.g., against the body portion 102). The first member 704 and second member 706 pull the flap portion 104 and the body portion 102 against each other to form a complete seal between the body portion 102 and the flap portion 104, which can mitigate contents of the container from escaping through the dispensing closure.

According to some aspects, the engagement of the snap beads (e.g., first member 704 and second member 706) of the lock member 702 can operate as a flap-to-body locking mechanism to prevent inadvertent opening of the flap portion 104.

In accordance with some aspects, the lock member 702 is formed on the sides of the lock portion 130 located on an outer edge 122 of the flap portion 104. In accordance with some aspects, the lock member 702 is utilized without the lock portion described with reference to the above figures.

In view of exemplary systems shown and described above, methods that may be implemented in accordance with the disclosed subject matter, will be better appreciated with reference to various flow charts. While, for purposes of simplicity of explanation, methods are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methods described herein. It is to be appreciated that functionality associated with blocks may be implemented by software, hardware, a combination thereof or any other suitable means (e.g. device, system, process, component, controller, injection molding machinery, and so on). Additionally, it should be further appreciated that methods disclosed throughout this specification are capable of being stored on an article of manufacture to facilitate transporting and transferring such methods to various devices. Those skilled in the art will understand and appreciate that a method could alternatively be represented as a series of interrelated states or events, such as in a state diagram.

Figure 8:
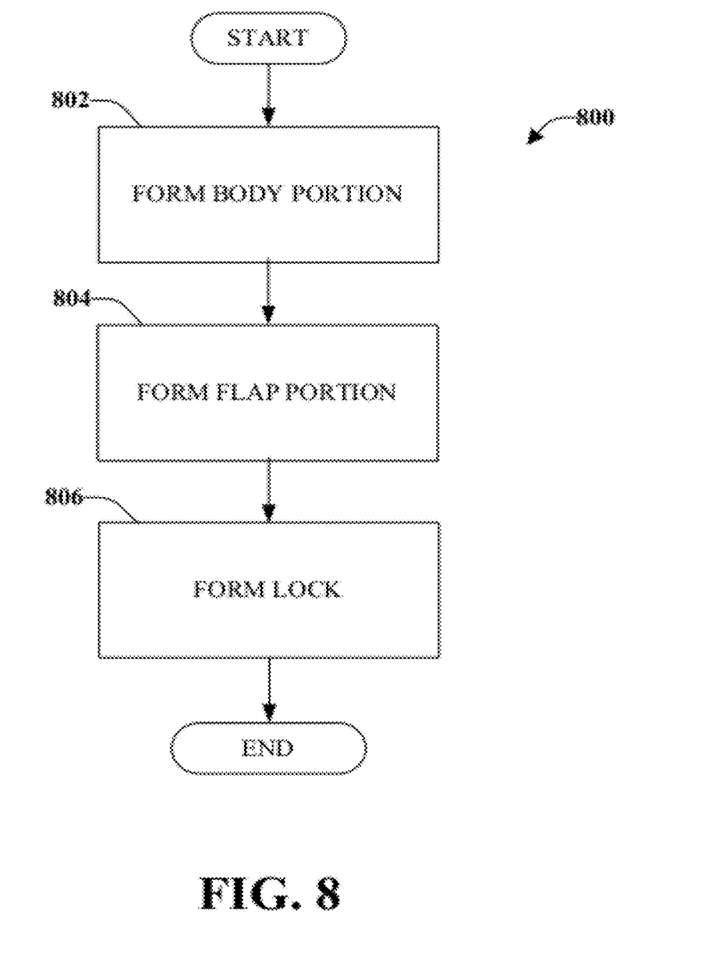
FIG. 8 illustrates a method for producing a dispensing closure with a full open option, according to an aspect

FIG. 8 illustrates a method 800 for producing a dispensing closure with a full open option, according to an aspect. In accordance with some aspects, the dispensing closure is formed of an injection molded suitable thermoplastic material, polymer (e.g., polypropylene), or other material well known in the art. According to some aspects, the dispensing closure is molded as two separate pieces, wherein a first piece comprises the disk and the second piece comprises the body portion and the lid. After molding the two separate pieces, assembly of the two pieces is performed as a second step in the molding process. In accordance with some aspects, the dispensing closure is molded as three or more pieces. In some aspects, the dispensing closure is molded as a single piece.

In accordance with some aspects, the dispensing closure can be formed by a multi-shot injection molding process (e.g., two-shot, three-shot, and so forth). Generally, each "shot" is an injection molding process. For example, the body portion and at least a portion of the flap portion (e.g., lid) are molded during a first injection process and the disk is molded during a second molding process. In another aspect, the dispensing closure might consist of different colors, wherein a different shot is used for each color. Additionally or alternatively, the dispensing closure can be made of different materials, wherein a different shot is utilized for each material. However, it should be understood that any number of shots can be utilized and can be applied in any order (e.g., the disk can be formed during the first shot and the body portion and lid can be formed during the second shot).

Method 800 starts, at 802, when a body portion is formed. The body portion can be formed with an end wall and a skirt that depends from the end wall. The skirt is configured to engage the dispensing closure with a container. Also formed in the body portion can be an opening in the end wall. The opening can be about the same size as the end wall and contents of the container are accessed through the opening.

At 804, a flap portion is formed. The flap portion can be formed with a lid that comprises at least one dispensing opening and a disk in rotatable contact with the lid. The disk can comprise one or more dispensing orifices The at least one dispensing opening aligns with the one or more dispensing orifices to dispense contents of the container in a pourable manner. In accordance with some aspects, the lid comprises a plurality of dispensing openings. According to some aspects, the disk comprises a plurality of dispensing orifices. A hinge can be formed to operatively connect the body portion and the flap portion.

The dispensing closure can also be formed with a grip portion that facilitates rotatable movement of the disk over the lid. The grip portion can be formed with the lid. In accordance with some aspects, the grip portion is formed with the disk.

At 806, a positive lock is formed. The positive lock comprises a surface area, a first substantially vertical piece formed on a first side of the surface area, a second substantially vertical piece formed on a second side of the surface area, and a substantially horizontal piece formed at a bottom of the first substantially vertical piece and the second substantially vertical piece. The surface area, the first substantially vertical piece, the second substantially vertical piece, and the substantially horizontal piece form a latched opening.

Forming the positive lock also comprises a lock engagement opening formed in the skirt and a protrusion formed on an internal portion of the skirt under the lock engagement opening. The latched opening is configured to engage the protrusion when the flap portion is in contact with the body portion.

Additionally or alternatively, at 806, a sift-resistant lock is formed. The sift-resistant lock can comprise a first member and a second member that operatively engage and pull the flap portion against the body portion to form a seal. In accordance with some aspects, the sift-resistant lock is formed on the sides of the positive lock located on an outer edge of the flap portion.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications, and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A dispensing closure, comprising:
a living hinge that operatively connects a flap portion in movable engagement with a body portion,
the body portion comprising:
an end wall and a skirt that depends from the end wall, the skirt engages the dispensing closure with a container; and
an opening in the end wall, wherein the opening is about the same size as the end wall and corresponds to about the same size as a container mouth for a full-open dispensing capability, and contents of the container are accessed through the opening when the flap portion is moved away from the body portion; and
the flap portion comprising:
a lid that comprises at least one dispensing opening; and
a disk in rotatable contact with the lid, the lid and the disk are separate pieces that are operatively attached to form the flap portion, the disk comprises one or more dispensing orifices, wherein a size of the one or more dispensing orifices is less than about half the size of the container mouth for a less than full-open dispensing capability, and contents of the container are access through the one or more dispensing orifices when the flap portion is in contact with the body portion, wherein movement of the flap portion facilitates a corresponding change between the full-open dispensing capability and the less than full-open dispensing capability.

2. The dispensing closure of claim 1, wherein the at least one dispensing opening of the lid aligns with the one or more dispensing orifices of the disk to dispense contents of the container in a pourable manner in the less than full-open dispensing capability.

3. The dispensing closure of claim 1, further comprising a grip portion that facilitates rotatable movement of the disk over the lid.

4. The dispensing closure of claim 1, further comprising a lock member that engages the body portion and the flap portion in a sift-resistant manner.

5. The dispensing closure of claim 1, further comprising a positive lock comprising a lock portion formed on an outside of the flap portion, wherein the lock portion comprises:
a surface area;
a first substantially vertical piece formed on a first side of the surface area;
a second substantially vertical piece formed on a second side of the surface area; and
a substantially horizontal piece formed at a bottom of the first substantially vertical piece and a bottom of the second substantially vertical piece, wherein the surface area, the first substantially vertical piece, the second substantially vertical piece, and the substantially horizontal piece form a latched opening.

6. The dispensing closure of claim 5, further comprising:
a lock engagement opening formed in the skirt;
a protrusion formed on an internal portion of the skirt under the lock engagement opening, wherein the latched opening is configured to engage the protrusion when the flap portion is in contact with the body portion.

7. The dispensing closure of claim 1, further comprising a push button lock formed on an outer edge of the dispensing closure, the push button lock retains the flap portion in contact with the body portion.

8. The dispensing closure of claim 1, further comprising:
a lock portion at an outer edge of the flap portion; and
a lock member formed on at least one side of the lock portion.

9. The dispensing closure of claim 1, wherein the body portion and the flap portion are formed as a single unit.

10. The dispensing closure of claim 1, wherein the at least one dispensing opening is round.

11. The dispensing closure of claim 1, wherein the at least one dispensing opening is non-round.

12. The dispensing closure of claim 1, wherein the one or more dispensing orifices are round.

13. The dispensing closure of claim 1, wherein the one or more dispensing orifices are non-round.

14. A dispensing closure, comprising:
a body portion, comprising:
an end wall and a skirt that depends from the end wall, the skirt engages the dispensing closure with a container; and
a full-open dispensing opening that is about the same size as the opening of a mouth of the container; and
a flap portion comprising:
a lid comprising a dispensing opening;
a disk comprising a dispensing orifice that corresponds to the dispensing opening of the lid, where rotatable movement of the disk causes the dispensing orifice to align with the dispensing opening and provide a less-than full open dispensing opening, wherein the lid and the disk are separate pieces that are operatively attached to form the flap portion;
a lock portion formed on an outside edge of the flap portion, the lock portion comprising:
a surface area;
a first substantially vertical piece formed on a first side of the surface area;
a second substantially vertical piece formed on a second side of the surface area; and a substantially horizontal piece formed at a bottom of the first substantially vertical piece and a bottom of the second substantially vertical piece, wherein the surface area, the first substantially vertical piece, the second substantially vertical piece, and the substantially horizontal piece form a latched opening;

wherein movement of the flap portion away from the body portion causes a change from the less-than full open dispensing opening to the full open dispensing opening.

15. The dispensing closure of claim 14, further comprising:
a lock engagement opening formed in the skirt;
a protrusion formed on an internal portion of the skirt under the lock engagement opening, wherein the latched opening is configured to engage the protrusion when the flap portion is in contact with the body portion.

16. A dispensing closure, comprising:
a living hinge that connects a flap portion in movable engagement with a body portion,
the body portion comprising:
  an end wall and a skirt that depends from the end wall, the skirt engages the dispensing closure with a container, wherein the end wall defines an opening that is sized for a full open dispensing mode with respect to a mouth of a container to which the skirt is operatively connected, and wherein contents of the container are accessed through the opening when the flap portion is moved away from the body portion;
the flap portion comprising:
  a lid that comprises at least one dispensing opening; and
  a disk, which is separate from the lid and in rotatable contact with the lid, wherein the disk and the lid are operatively attached to form the flap portion, the disk comprises one or more dispensing orifices, wherein contents of the container are accessed through the one or more dispensing orifices aligned with the one or more dispensing orifices in a less than full-open dispensing mode when the flap portion is in contact with the body portion, and wherein the dispensing of the container contents in a full open dispensing mode and the less than full-open dispensing mode is changeable as the flap portion is moved away from the body portion or is moved into contact with the body portion; and
a lock member that engages the body portion and the flap portion in a sift-resistant manner.

17. The dispensing closure of claim 16, wherein the lock member comprises a lock portion formed on an outside edge of the flap portion, the lock portion comprising:
a surface area;
a first substantially vertical piece formed on a first side of the surface area;
a second substantially vertical piece formed on a second side of the surface area; and
a substantially horizontal piece formed at a bottom of the first substantially vertical piece and a bottom of the second substantially vertical piece, wherein the surface area, the first substantially vertical piece, the second substantially vertical piece, and the substantially horizontal piece form a latched opening.

\* \* \* \* \*